United States Patent [19]

Dlugos

[11] Patent Number: 5,914,463
[45] Date of Patent: Jun. 22, 1999

[54] LOW COST DIMENSIONAL DETERMINING SYSTEM

[75] Inventor: Daniel F. Dlugos, Shelton, Conn.

[73] Assignee: Pitney Bowes Inc., Stamford, Conn.

[21] Appl. No.: 08/775,549

[22] Filed: Dec. 31, 1996

[51] Int. Cl.[6] .......................... G01G 19/22; G01G 19/40
[52] U.S. Cl. .................................. 177/25.11; 177/25.12; 177/25.15; 177/4
[58] Field of Search .................. 177/4, 25.11, 25.12, 177/25.13, 25.14, 25.15

[56] References Cited

U.S. PATENT DOCUMENTS

| | | | |
|---|---|---|---|
| 2,689,082 | 9/1954 | Kolisch | 235/61 |
| 2,708,368 | 1/1955 | Kolisch | 73/432 |
| 4,773,029 | 9/1988 | Claesson et al. | 364/562 |
| 5,042,015 | 8/1991 | Stringer | 367/99 |
| 5,105,392 | 4/1992 | Stringer et al. | 367/99 |
| 5,175,595 | 12/1992 | Fukase | 356/387 |
| 5,266,810 | 11/1993 | Murphy | 250/560 |
| 5,340,948 | 8/1994 | Ramsden | 177/25.15 |

*Primary Examiner*—Michael L. Gellner
*Assistant Examiner*—Anh Mai
*Attorney, Agent, or Firm*—Charles R. Malandra, Jr.; Melvin J. Scolnick

[57] ABSTRACT

A dimensional weighing apparatus is disclosed which has a weighing scale for determining the actual weight of a carton placed thereon, and associated therewith is a measuring frame and an optical sensing system for measuring the linear distance of the three axes of carton positioned on the scale necessary to determine the volume of the carton. A computer processing means determines firstly whether the actual volume of the carton is less or greater than a predetermined threshold volume, and if greater, calculates a dimensional weight of the carton and compares the dimensional weight of the carton with the actual weight to determine which weight is the larger, and sends a signal indicative of the larger weight to a shipping system which determines an appropriate shipping charge for the carton based on the weight determined by the dimensional weighing apparatus to be the larger of the two weights.

10 Claims, 7 Drawing Sheets

LOW COST DIMENSIONAL DETERMINING SYSTEM

RELATED APPLICATIONS

Reference is made to application Ser. No. 08/775,850, entitled APPARATUS AND METHOD FOR DIMENSIONAL WEIGHING UTILIZING A LASER SCANNER, assigned to the assignee of this application and filed on even date herewith.

Reference is made to application Ser. No. 08/775,672, entitled METHOD FOR DIMENSIONAL WEIGHING UTILIZING POINT DETERMINATION, assigned to the assignee of this application and filed on even date herewith.

Reference is made to application Ser. No. 08/775,673, entitled METHOD FOR DIMENSIONAL WEIGHING UTILIZING SPACED LINE PROJECTION, assigned to the assignee of this application and filed on even date herewith.

Reference is made to application Ser. No. 08/775,671, entitled METHOD FOR DIMENSIONAL WEIGHING WITH OPTICS, assigned to the assignee of this application and filed on even date herewith.

Reference is made to application Ser. No. 08/775,851, entitled COARSE VOLUME MEASUREMENT WITH INTERLOCK, assigned to the assignee of this application and filed on even date herewith.

Reference is made to application Ser. No.08/775,675, entitled DIMENSIONAL WEIGHING APPARATUS, assigned to the assignee of this application and filed on even date herewith.

Reference is made to application Ser. No. 08/775,550, entitled DIMENSIONAL WEIGHING UTILIZING A FOLLOWING ARM MECHANISM, assigned to the assignee of this application and filed on even date herewith.

Reference is made to application Ser. No. 08/775,214, entitled DIMENSIONAL WEIGHING UTILIZING A LINEAR DISPLACEMENT TRANSDUCER, assigned to the assignee of this application and filed on even date herewith.

Reference is made to application Ser. No. 08/775,213, entitled APPARATUS AND METHOD FOR DIMENSIONAL WEIGHING UTILIZING A ROTATING SENSOR, assigned to the assignee of this application and filed on even date herewith.

Reference is made to application Ser. No. 08/775,674, entitled APPARATUS AND METHOD FOR DIMENSIONAL WEIGHING UTILIZING A MIRROR AND/OR PRISM, assigned to the assignee of this application and filed on even date herewith.

BACKGROUND OF THE INVENTION

The present invention relates generally to the concept of dimensional weighing to determine the charge required by a carrier for transporting a package or parcel, and more particularly to a dimensional weighing system suitable for use by a variety of shippers and carriers to determine accurate freight charges for packages or parcels that are considerably oversized in comparison to their actual weight.

The concept of dimensional weighing has long been well known, and prior art relating to various dimensional weighing systems and apparatus has been available for over forty years. However, the concept of dimensional weighing did not receive widespread acceptance for many decades due to several reasons. One of these is that when the concept was first developed, the carriers were willing to accept freight charges based on weight as being a reasonably accurate system for determining the charge for shipping individual packages. Since the Government postal system had been determining postage charges for mail delivery based on weight since the inception of the mail system, it was only logical at the time that parcel and package carriers should do likewise. Thus, it became fairly standard in the infant industry to weigh parcels and determine freight charges according to a schedule of charges based on different weight categories. As time progressed and the distances that parcels and packages traveled became greater, a distance factor was added to the formula so that two packages having the same weight would be charged differently depending on the distance that each traveled. However, distance for any given destination from a dispatch location is the same regardless of whether a basic freight charge is based on weight or dimension.

Another reason that delayed the acceptance of the dimensional weighing concept was that at the outset there was no convenient and economic apparatus available for carrying out the dimensional weighing process. The only known method was to physically measure the three dimensions of a parcel that are necessary to determine the volume thereof using a measuring stick or tape. Although this procedure produced the end result desired for the concept of dimensional weighing, it suffered the drawbacks of being slow and tedious, thereby greatly hampering the efficient handling of large quantities of parcels, and it was only as accurate as the person performing the measuring, thereby rendering it susceptible to either over or under charging. As time passed, some forms of apparatus were developed for automatically taking the necessary measurements to determine the volume of packages, but they were generally cumbersome and difficult to operate, and sufficiently expensive that they were not cost effective in terms of the benefit derived from them.

Still another reason for the slow acceptance of the dimensional weighing concept was that packaging techniques commonly utilized in the early days of package and parcel shipping by private carriers were such that they were satisfied that they were obtaining a reasonable and fair return for their service by determining freight charges based on weight. Most merchandise shipped was of a fairly durable nature, and the size of the package was reasonably close to the size of the packaged article, with the result that a freight charge based on weight was reasonably accurate and the concept of dimensional weighing simply wasn't necessary.

As time passed, these circumstances changed; the logic of accepting weight as being the basis for determining freight charges for parcels and packages became questionable since the carriers began to realize that parcels and packages are quite different in many respects from mail, as will become more evident hereinbelow. Further, as interest began to develop in the concept of dimensional weighing, more practical and efficient, as well as less complicated and costly, apparatus began to appear, thereby rendering dimensional weighing easier to perform and with more reliable accuracy. Finally, and certainly not the least significant factor, is that with the development of so-called high-tech materials and methods of manufacture, many products became lighter in weight but more fragile to handle, with the result that packaging techniques changed to accommodate these characteristics. Thus, it became necessary to devise packaging techniques that would protect such fragile products from the obvious hazards of being subjected to rough handling in the course of shipment, with the result that relatively light products were being packaged in relatively large boxes, and the carriers became concerned that they were no longer receiving a reasonable and fair return for their services in the case of a large percentage of parcels and packages being shipped.

The importance of the dimensional weighing concept became evident to carriers with the realization that, with ever increasing frequency, shippers were packing relatively light and relatively fragile products in large cartons and boxes and surrounding the products with various forms of cushioning and shock absorbing materials that occupied considerable space but had little weight. For example, such materials as pre-formed foam panels which conform to the shape of a product so as to cushion it on all sides, foam materials of various irregular shape often referred to as nuggets or "peanuts", which are literally poured into a carton both before and after the product is placed in the carton so as to entirely surround it and insulate it from the sides of the carton, as well as bubble wrap, cardboard or plastic spacers, etc., all became standard package shipping materials. These materials occupy a considerable amount of space and exert virtually no weight. The obvious result of this packaging technique is a relatively large carton having a greatly disproportionate size for its actual weight.

Again, as time progressed, this disparity between the traditional weight-size relationship of the early days of private shipping began to manifest itself in lost revenue to the carriers because of the double effect of being able to transport fewer and fewer parcels and packages in a given shipment due to the increase in the unit size of parcels and packages, combined with the loss of weight which was the primary factor determining the freight charge for a parcel or package. This effect became especially severe with the development of air freight, where two opposing factors can determine whether a particular freight shipment will result in a profit or a loss to the carrier. These factors are the relatively high cost of operating an airplane to transport freight from one location to another, combined with the relatively severe limitation on the amount of space available for carrying the freight on each plane. Thus, if one plane carrying a certain volume of freight is transporting relatively heavy products on which a substantial freight payment was charged by the carrier, the operation will be profitable. If, on the other hand, the same plane carries the same volume of freight, but the products are relatively light in weight while the cartons are large due to the quantity of shock insulating material in the carton, the freight payment charged by the carrier based on the weight will be considerably less than in the first example, with the result that the profit to the carrier will be much less, if not entirely absent.

Thus, within the last ten years or so, the carriers have come to realize that the traditional basis of weight for determining freight charges is no longer acceptable in the case of a large percentage of parcels and packages, and they have at least partially if not fully embraced the concept of dimensional weighing. And the carriers have sought to enforce shippers, both large and small, to do likewise with considerable success, with the result that the need for highly efficient, accurate and inexpensive dimensional weighing equipment is steadily increasing. As the carriers turned more and more to dimensional weighing techniques to determine freight charges for what appeared just prior to shipping to be very light packages for their size, the carriers would dimensionally weigh such packages and would assess the freight charge based on the dimension of the package rather than its actual weight, and this charge would be billed back to the shipper, who would then incur a loss of the difference between what the shipper had invoiced the receiver for the freight charge and what he was billed by the carrier based on dimensional weight. For example, if a shipper, e.g., a manufacturer, engages a carrier to transport a certain number of large cartons to various receivers, e.g., wholesale distributors, with each carton containing a certain number of relatively light, fragile products, and the shipper has invoiced each receiver for the price of the goods plus a freight charge based on the weight of each carton, the shipper receives the invoice immediately after he ships the goods. When the carrier takes possession of the cartons, he sees that they are relatively light for their size and he dimensionally weighs each carton, and thereby determines a freight charge substantially larger than that which the shipper determined based on weight and for which he invoiced the receiver. The carrier now bills the shipper for the freight charge based on dimension, but the shipper has lost his best opportunity to recoup this larger charge from the receiver, since he has already invoiced the receiver for the lesser freight charge. The shipper thus lost money on the transaction by underestimating the proper freight charge for that shipment by having initially determined the freight charge based on weight rather than dimension.

As the practice of dimensional weighing became more commonplace, certain guide lines were developed to assist in making on the spot determinations of which packages and parcels should be dimensionally weighed and which should not, since it is neither necessary nor efficient to dimensionally weigh every parcel and package that passes through either the shipper's or the carrier's hands. Thus, it has become rather well settled that any parcel or package that has a volume in excess of a minimum size, e.g., one cubic foot, should be dimensionally weighed, unless it is obvious to the weigher that it is sufficiently heavy that a freight charge based on weight would be reasonably accurate. The typical individual length, width and height dimensions used to determine the one cubit foot volume are 12"×12"×12", but other dimensions could also result in a one cubic foot volume. Also, the minimum volume may vary from one cubic foot depending on the practice of individual shippers and carriers.

Although the concept of dimensional weighing has now been generally accepted and the practice has become relatively commonplace, there still remains a shortage of suitable apparatus for carrying out the practice. There are certain characteristics which dimensional weighing apparatus must possess in order to be considered suitable for performing dimensional weighing in the most practical and cost effective manner. Firstly, the apparatus must be sufficiently non-complex that it can be operated by persons without specialized technical training. Secondly, it must have the capability of operating with considerable speed in order to handle a large number of parcels in rapid succession. Thirdly, it must have a high degree of accuracy consistent with the extent of resolution that is desired in a particular installation. Fourthly, it must be easy to install and maintain, and have a high degree of reliability for long term consistent operation. Finally, it must be sufficiently economical that it is more cost effective for a shipper to purchase the apparatus than to continue running the risk of consistent undercharging for packages that are inordinately large in comparison to their weight.

Until the advent of the present invention, there was no single piece of dimensional weighing apparatus that possessed all of these characteristics. Prior art dimensional weighing apparatus has consistently suffered from having one or more of the disadvantages of being bulky and difficult to operate, slow in operation and subject to various extraneous conditions that adversely affect the accuracy, and expensive in compared to the benefits derived and therefore not especially cost effective. Certain older forms of dimensional weighing apparatus relied on mechanical switching arrangements contacted by a carton placed on a scale platform, thereby adversely affecting the accuracy of the scale and also introducing a considerable degree of unreliability of the mechanical parts for proper and consistent operation. As electronic controls became common, the methods devised for measuring the linear dimensions of cartons and packages were complex and bulky, including ultra-sonic technology which lacked sufficient accuracy and light curtains which could only measure two dimensions of a carton, and difficult for a non-technically trained person to operate. Many of these prior art machines were so expensive that the purchase price could be effectively justified only by the largest shippers, thereby precluding a major segment of potential shippers from practicing dimensional weighing except by archaic manual techniques. Thus, there is a need for dimensional weighing apparatus that possesses the above mentioned desirable characteristics and avoids the shortcomings and disadvantages of the heretofore known dimensional weighing apparatus.

SUMMARY OF THE INVENTION

The foregoing shortcomings and disadvantages of prior art dimensional weighing systems are largely obviated, if not entirely eliminated, by the dimensional weighing apparatus of the present invention. More specifically, this apparatus provides the features of simplicity, convenience, reliability and speed of operation, and economy of manufacture, installation and operation, all not available with previously known dimensional weighing apparatus.

In its broader aspects, the dimensional weighing apparatus of the present invention is adapted for use with a shipping system which determines an appropriate shipping charge for packages and parcels based on an appropriate shipping weight as determined by the dimensional weighing apparatus. Within this environment, the dimensional weighing apparatus comprises means defining a supporting surface, a weighing scale mounted on the supporting surface and having a platform on which cartons are placed for determining the weight of the cartons, and a measuring frame operatively associated with the supporting surface. There is a means operatively associated with the measuring frame for measuring the linear distance of the length, width and height of a carton placed on the platform, and a computer processing means responsive to operation of the weighing scale and the measuring means for determining a shipping weight of a carton by calculating the dimensional weight thereof and for comparing the dimensional weight with the actual weight to determine which of the weights is the larger, whereby the dimensional weighing apparatus determines the appropriate shipping weight on which the shipping system determines an appropriate shipping charge.

In some of its more limited aspects, the weighing scale includes means defining a reference point for cartons disposed on the platform of the weighing scale for positioning cartons in a predetermined location on the platform relative to the measuring frame such that the surfaces of the cartons adjacent the measuring frame are disposed in spaced relationship therewith. The means defining the reference point comprises guide means mounted on the scale platform in spaced parallel relationship with the measuring arms for ensuring that the surfaces of cartons disposed on the platform in the predetermined location are disposed in evenly spaced parallel relationship with the measuring arms. The measuring frame includes a plurality of elongate measuring arms extending from a juncture of the measuring arms disposed adjacent to the reference point along the two horizontal axes of cartons and the vertical axis thereof, the juncture of the measuring arms being disposed in closely spaced relationship with the reference point.

The means for measuring the linear distance of the length, width and height of a carton disposed on the platform comprises optical sensing means associated with each of the measuring arms for determining the extent to which each of the adjacent surfaces of a carton disposed on the platform in the predetermined location extends along the adjacent measuring arm. Further, in one embodiment of the invention, the optical sensing means comprises a plurality of optical emitters mounted on the measuring arms in equally spaced relationship therealong, and a sensor mounted in spaced relationship with the measuring arms in a position such that all of the emitters which are not obscured by a carton disposed on the platform are exposed to the field of vision of the sensor so that the sensor can distinguish between the number of emitters that are obscured by a carton and the number of emitters that are not obscured by the carton. In another embodiment of the invention, the single sensor is replaced with three sensors, one for each arm, and each sensor is disposed in a position such that emitters on each measuring arm which are not obscured by a carton disposed on the platform are exposed to the field of vision of the sensor associated with that measuring arm so that each of the sensors can distinguish between the number of emitters on the associated measuring arm that are obscured by a carton and the number of emitters that are not obscured by the carton.

The computer processing means for determining the shipping weight of a carton includes a central processing unit having means for determining whether or not the volume of a carton exceeds a predetermined threshold volume below which the central processing unit determines a shipping weight based on the actual weight of the carton as determined by the weighing scale, and at or above which the dimensional weighing apparatus calculates a shipping weight based on the volume of the carton independent of the weight thereof as determined by the weighing scale. To accomplish this, the central processing unit also includes a memory storage means for storing the predetermined threshold volume, a memory storage means for storing the individual linear dimensions of the length, width and height of a carton disposed on the platform, means for calculating the volume of the carton based on the linear dimensions, and means for comparing the calculated volume of the carton with the predetermined threshold volume to determine which is the larger, so that the shipping system can determine an appropriate shipping charge for the carton based on that larger weight.

The computer processing means further includes a memory storage means for storing a dimensional weight constant in terms of cubic units per unit of weight, means for calculating a dimensional weight by dividing the actual volume of the carton by the dimensional weight constant, and means for comparing the actual weight with the calculated dimensional weight to determine which is the larger, which is the shipping weight on which the shipping system determines the appropriate shipping charge.

Having briefly described the general nature of the present invention, it is a principal object thereof to provide a dimensional weighing apparatus which has advantageous features of simplicity, convenience, reliability and speed of operation, and economy of manufacture, installation and operation not heretofore known in prior art dimensional weighing apparatus.

Another object of the present invention is to provide a dimensional weighing apparatus which provides a preliminary indication of whether or not it is necessary to calculate a shipping weight based on the volume of a carton by determining whether that volume is less than or exceeds a predetermined threshold volume.

A further object of the invention is to provide a dimensional weighing apparatus in which a measuring apparatus determines the linear measurements of the length, width and height of the carton without the carton contacting any portion of a measuring frame of the dimensional weighing apparatus which could adversely affect the actual weight thereof.

A still further object of the present invention is to provide a dimensional weighing apparatus which utilizes a weighing device for determining the actual weight of cartons and a measuring apparatus for measuring the length, width and height of cartons, and a computer processing unit to determine the volume thereof and to calculate a dimensional weight, and which determines a shipping weight for the cartons based on whether the actual weight or the dimensional weight is the greater, on which an appropriate shipping charge will be determined.

These and other objects and features of the dimensional weighing apparatus of the present invention will be more apparent from a consideration of the following detailed description of presently preferred embodiments of the invention, when considered in conjunction with the accompanying drawings.

DETAILED DESCRIPTION OF THE PREFERRED EMBODIMENTS

Figure 1:
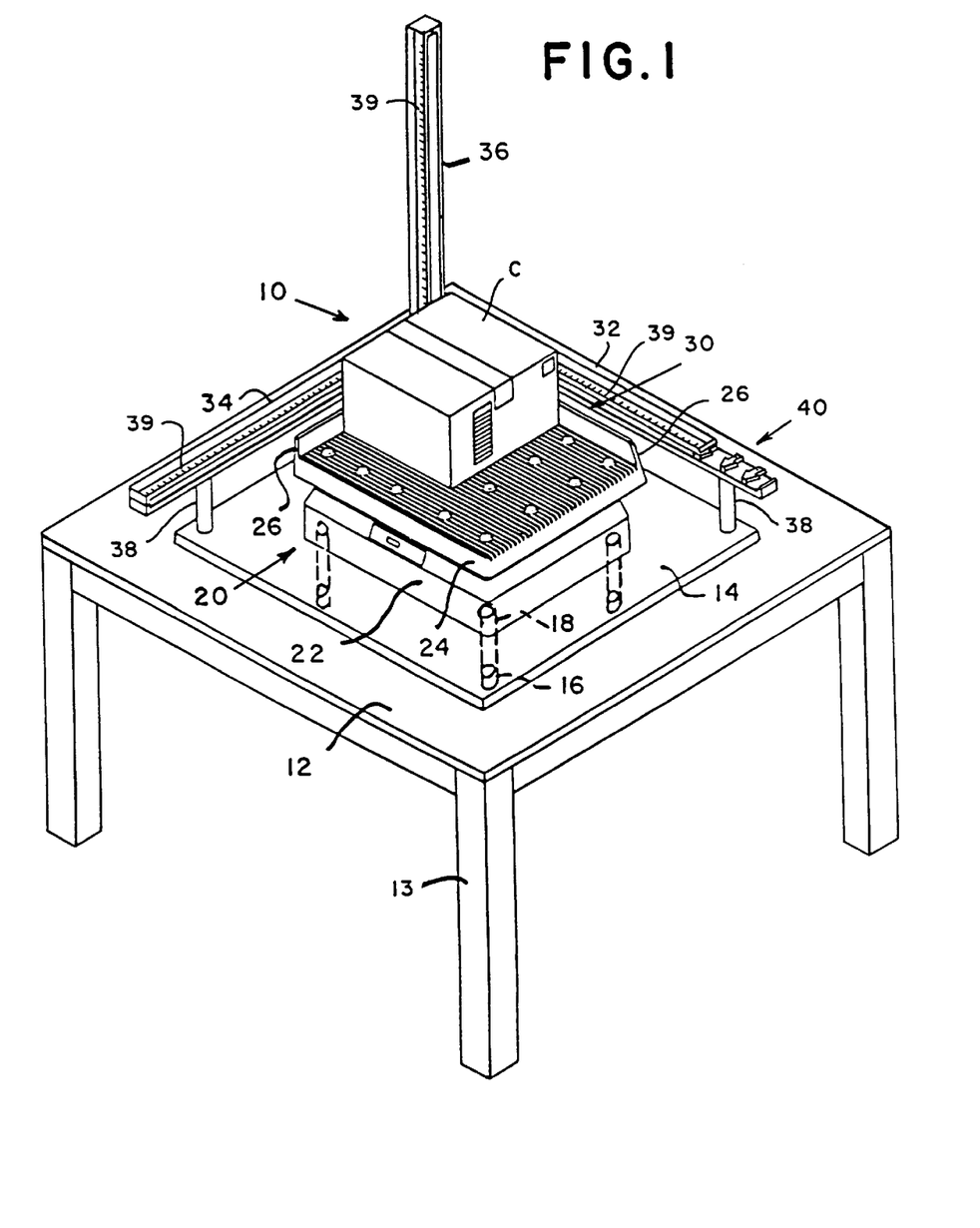
FIG. 1 is a perspective view of one embodiment of a dimensional weighing apparatus embodying the principles of the present invention, illustrating the relationship between a weighing scale with a carton thereon and a dimensional measuring frame.

Referring now to the drawings, and particularly to FIG. 1 thereof, the dimensional weighing apparatus of the present invention is indicated generally by the reference numeral 10. The apparatus 10 is mounted on and supported by any suitable horizontal surface, such as the surface 12 which is supported by the legs 13. It will, of course, be apparent, that any suitable support, such as a work bench, counter top, desk, etc., may be utilized. Apparatus 10 includes a base 14 which is adapted to rest on the surface 12 or other supporting surface, the base 14 having registration apertures 16 which receive registration feet 18 mounted on the bottom wall of a weighing scale, indicated generally by the reference numeral 20.

Figure 2:
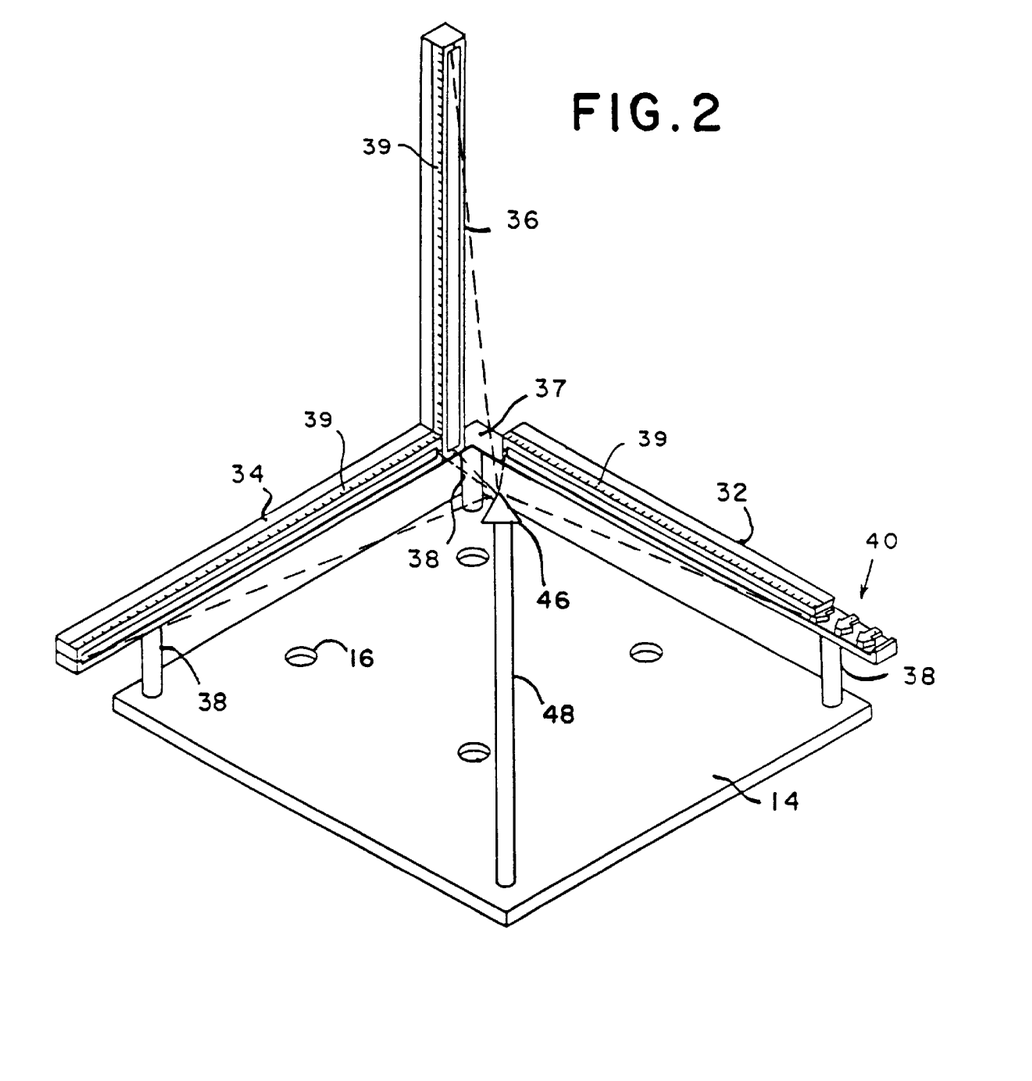
FIG. 2 is a view similar to FIG. 1, drawn to an enlarged scale, showing the dimensional weighing apparatus without the support, and with the scale and carton removed to reveal certain details.
Figure 3:
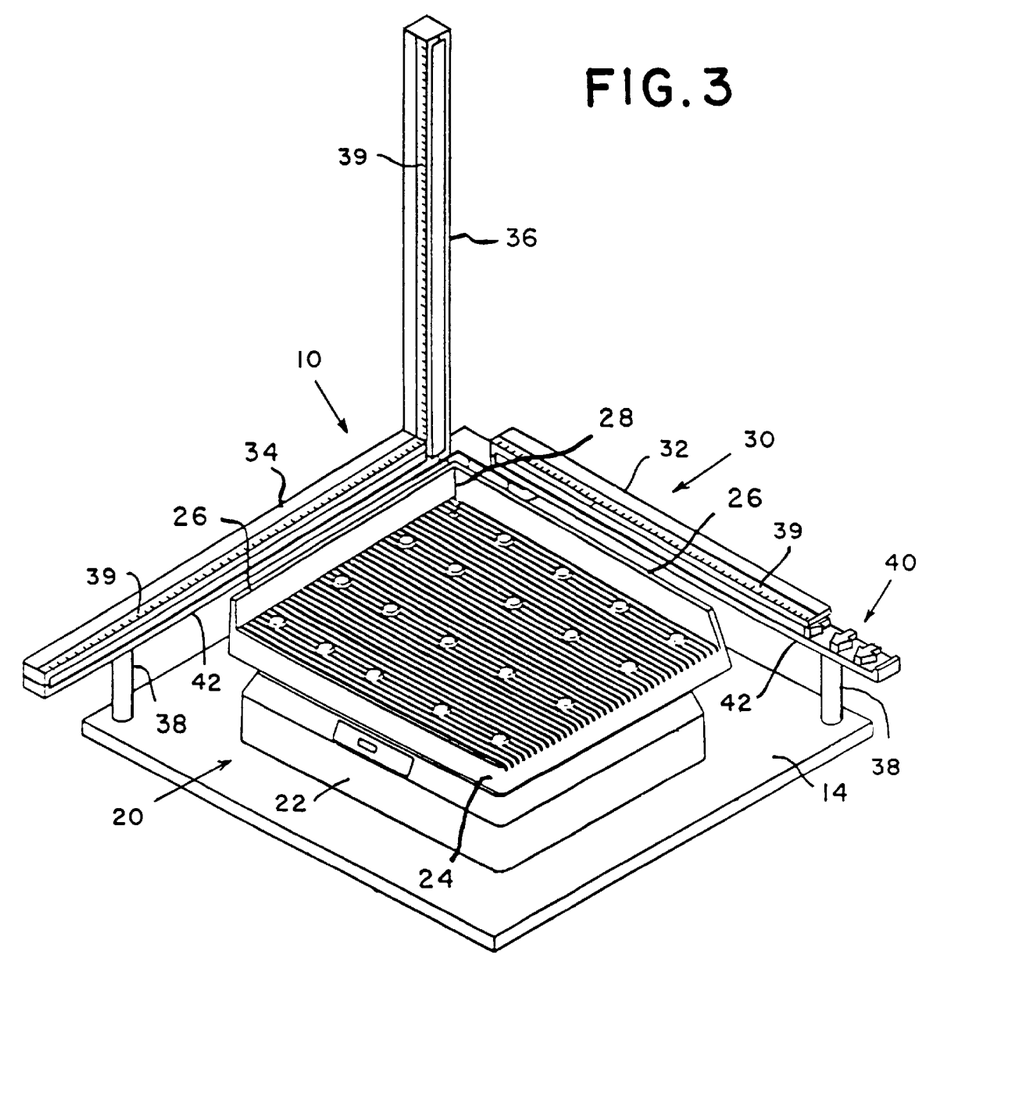
FIG. 3 is a view similar to FIG. 2, showing the dimensional weighing apparatus with the weighing scale in place.
Figure 4:
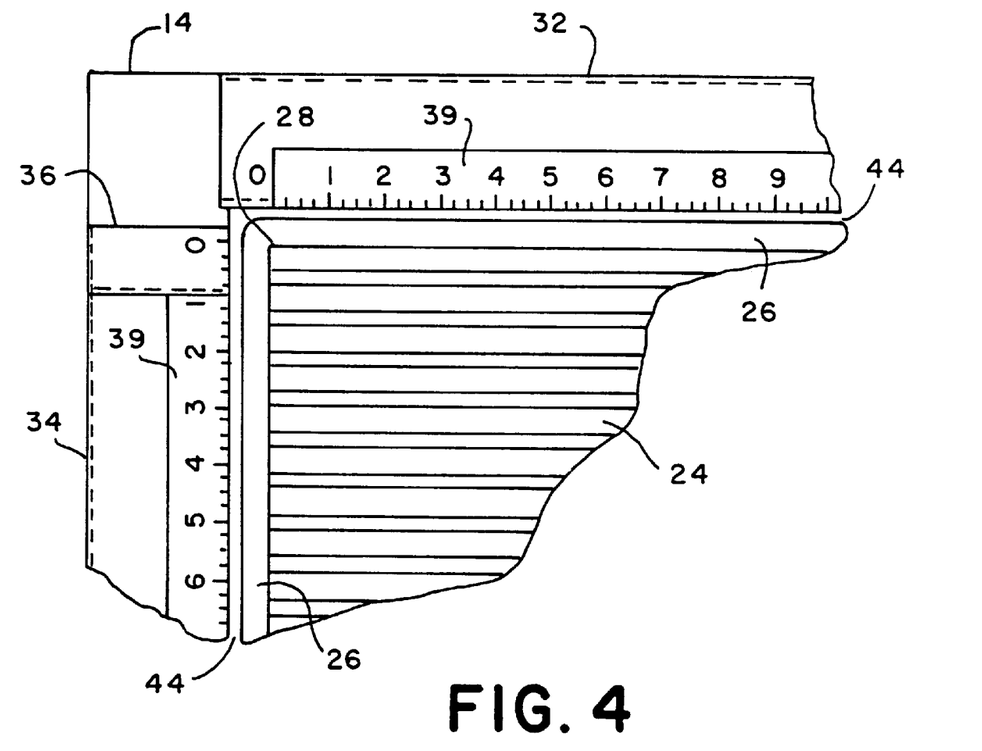
FIG. 4 is a fragmentary plan view of the apparatus shown in FIGS. 1, 2 and 3.

The weighing scale 20 includes a base unit 22 which houses all of the mechanical and electronic components of the scale 20 which are well known in the digital weighing art and need not be further described or shown herein for a full understanding of the present invention. The scale also includes a platform 24 which provides a surface on which cartons C to be weighed are placed. The platform 24 is provided with a pair of upstanding flanges 26 which constitute guides for ensuring that a carton is placed on the platform 24 in a precise predetermined location. As best seen in FIGS. 2 and 3, the adjacent ends of the upstanding flanges 26 form a reference point 28 for a lower rear corner of a carton placed on the platform 24, thereby establishing the aforementioned predetermined location, the significance of which will be made clear hereinbelow.

The dimensional weighing apparatus 10 further includes a linear measuring frame, indicated generally by the reference numeral 30, which includes three elongate measuring arms 32, 34 and 36, two of which, (32 and 34) are oriented in a horizontal plane and disposed perpendicular to each other so as to extend along the two horizontal axes of the carton C, the third (36) being vertically oriented to extend along the third axis of the carton C, thereby disposing the measuring arms 32, 34 and 36 so that they are in spaced parallel relationship with the adjacent surfaces of the carton C that represent the length, width and height of a carton disposed on the platform 24. The horizontally oriented measuring arms 32 and 34 rest on an L-shaped base member 37 which is supported on the base 14 by a plurality of suitable posts 38 which are also secured to the base 14 so that, as seen in FIG. 3, the measuring arms 32 and 34 maintain a fixed spatial and parallel relationship with the upstanding flanges 26 of the scale platform 24. The vertically oriented measuring arm 36 also rests on the base member 37 adjacent the inner ends of the horizontal measuring arms 32 and 34. Although the preferred embodiment is shown as above described, it is possible, within the scope of the invention, to mount the L-shaped base member 37 and the measuring arms 32, 34 and 36 directly on the scale platform 24, in which case the weight of these parts becomes part of the tare weight of the scale. It will also be seen that each of the measuring arms 32, 34 and 36 includes a linear scale 39 with numbers representing a unit of linear measurement, for example, an inch.

There is a means operatively associated with the measuring frame 30 for measuring the linear distance of the length, width and height of a carton disposed on the platform 24. Referring particularly to FIGS. 1, 2 and 3, this means comprises, an optical sensing system which, in one embodiment of the invention, includes a plurality of any suitable form of optical emitters 40, such as LEDs, which are disposed on each of the measuring arms 32, 34 and 36 in uniformly closely spaced relationship along substantially the entire length of the measuring arms 32, 34 and 36. Thus, in a practical arrangement, the aforementioned numbers and the emitters 40 are each spaced one inch apart. As best seen in FIG. 3, the horizontal measuring arms 32 and 34 are mounted on the base 14 and appropriately dimensioned such that the innermost edges 42 of these arms are in spaced parallel relationship with the adjacent edges of the upstanding flanges 26 on the platform 24, thereby leaving a relatively small clearance space 44 between these edges. This arrangement ensures, firstly, that the carton does not contact any portion of the measuring apparatus that could tend to support any of the weight of the carton, which would adversely affect the operation of the scale 20 in determining an accurate weight, and secondly that neither an edge corner nor side surface of a carton can contact and damage any of the emitters 40 in the event of rough handling in placing cartons on the scale platform 24 or removing them therefrom. Again, the preferred embodiment is shown as described above, but if the measuring arms 32, 34 and 36 are mounted directly on the scale platform, the upstanding flanges 26 can be eliminated since the measuring arms themselves would perform the function of the upstanding flanges.

The optical sensing system further includes a sensor 46 mounted on any suitable support as represented by the column 48 affixed to the base 14. It will be understood that the column 48 is shown for illustrative purposes only, and that any other suitable support or frame may be substituted for the column 48, since that may interfere somewhat with placing larger cartons on the platform 24. Thus, the sensor 46 can be secured to a suitable support member suspended from an overhead frame so as to support the sensor 46 in the position shown in FIG. 2 without any interfering structure adjacent to the scale platform 24. It is necessary, however, for the sensor 46 to be positioned sufficiently far from each of the measuring arms 32, 34 and 36 that the field of vision of the sensor 46 includes all of the emitters 40 that are not obscured by the largest carton disposed on the platform 24 for which the dimensional weighing apparatus 10 is designed to accommodate. To accomplish this, the sensor 46 must be positioned so that none of the emitters 40 not directly obscured by a carton would like in the shadow of any of the forward edges of the carton with respect to the field of vision of the sensor 46, as represented by the dotted line extending from the sensor 46 to the opposite ends of the measuring arms 32, 34 and 36. This means, in a practical arrangement, that the sensor 46 must be positioned so that it is at least as far horizontally from the outer ends of the measuring arms 32 and 34 as the length of the horizontal measuring arms 32 and 34, and spaced vertically from the platform 24 at least as high as the upper end of the vertical measuring arm 36.

Figure 5:
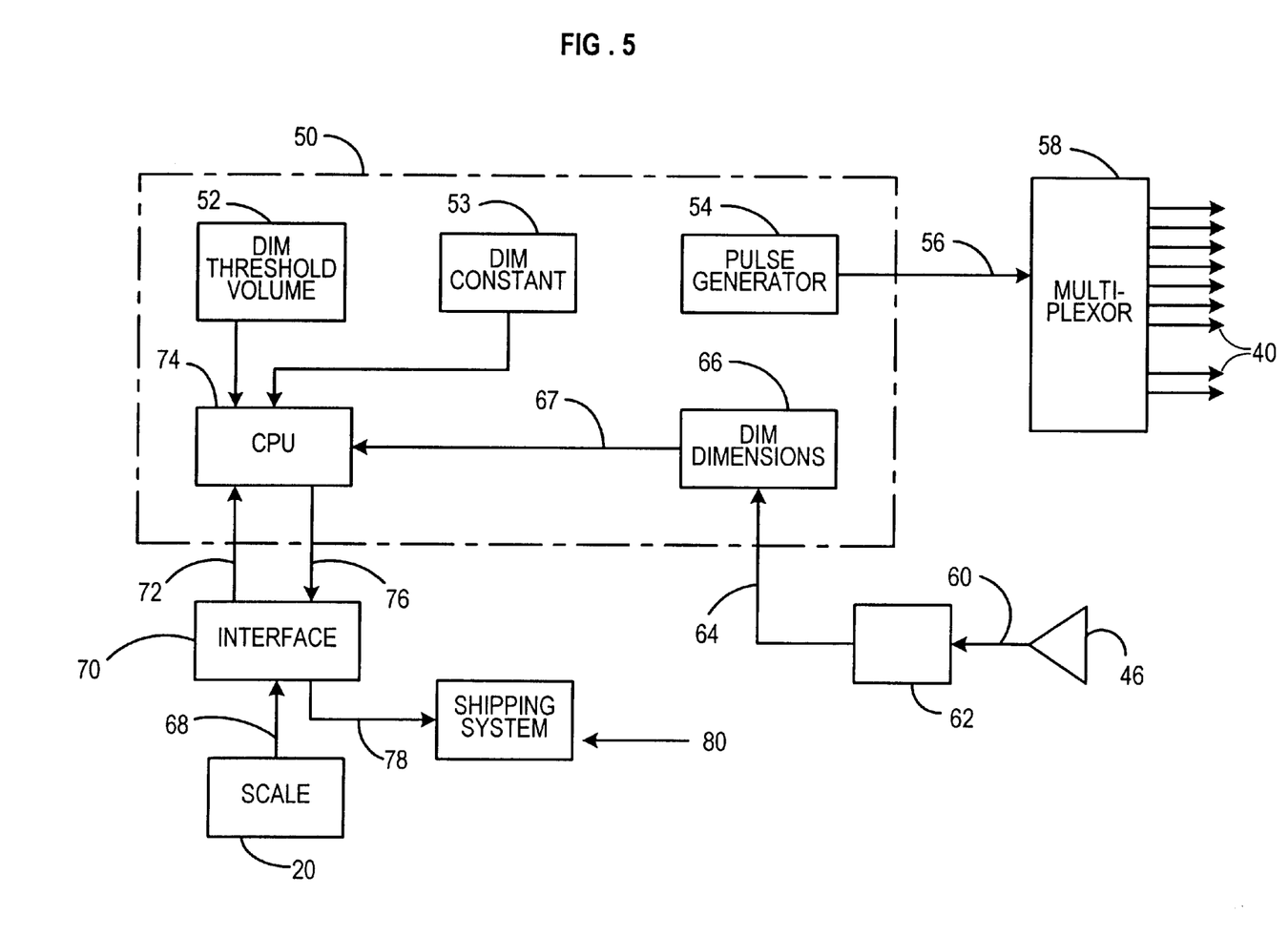
FIG. 5 is a schematic diagram of the major components of the electronic control system for the dimensional weighing apparatus of the present invention.

FIG. 5 illustrates schematically the major components of an electronic control system for controlling the operation of the previously described apparatus and for determining a shipping weight for a carton C disposed on the scale based on converting the actual or dimensional weight, as the case may be, of a carton into a shipping weight which is transferred to a shipping system which converts that weight into an appropriate shipping charge. It should be understood that the specific components described and shown herein are illustrative of the type of components required to perform the functions which are carried out by the apparatus of the present invention, and that other specific components may be utilized to achieve these functions.

The electronic control system includes a computer processing means 50 having a central processing unit which controls the operation of the apparatus 10 for determining the linear dimensions of a carton on the platform 24, calculating the volume thereof, comparing that volume with a predetermined threshold volume, calculating a dimensional weight for the carton and determining a shipping weight based on whether the dimensional weight is greater or less that the actual weight as determined by the scale 20.

Thus, the computer processing means 50 includes a first settable memory storage device 52 which stores a predetermined threshold volume that represents the volume of a carton, such as the one cubic foot mentioned above, below which the shipping weight would be calculated on the basis of the actual weight of the carton, and above which the shipping weight would be calculated on the basis of the dimensional weight of the carton. The computer also a includes a second settable memory storage device 53 which stores a variable dimensional constant, the amount of which can depend on the preference of a particular carrier, and which is used for converting the actual volume of a carton into a calculated dimensional weight. For the purpose of this determination, dimensional weight is defined as the cubic volume per unit of weight, the actual amounts depending on whether measurements are made using the English or metric measuring systems; for example, the constants generally adopted in the United States for the dimensional weight of cartons for shipping weight purposes is 194 cubic inches per pound for domestic service and 166 cubic inches per pound for international service. Alternatively, the memory storage devices 52 and 53 may store several predetermined threshold volumes and dimensional weight constants respectively to accommodate carriers which may use predetermined threshold volumes and dimensional weight constants other than those generally adopted, and also to accommodate both domestic and international service. In this situation, the memory storage devices 52 and 53 have suitable input controls by which the predetermined threshold volumes and dimensional weight constants are operator selectable for the specific carrier and/or particular class of service. Thus, once the actual volume of a carton is determined, that volume is divided by 194 or 166 respectively to determine the dimensional weight of the carton in pounds. The conversion of this dimensional weight into a shipping charge is further explained below.

The computer processing means 50 further includes a pulse generator 54 which produces a pulsing output signal through a line 56 to a multiplexor switch 58 which passes the signal to each of the emitters 40 in a rapid sequence so that only one emitter 40 is energized at a time. Preferably, the pulse generator 54 generates each pulse with a coded pulse pattern so that the sensor will recognize only the light from the emitters 40 and not light from any spurious source.

The sensor 46 responds to the light emitted by the LED emitters 40 and generates a signal through the line 60 to a suitable amplifier 62 which amplifies the signal and directs it through a line 64 to a third memory storage device 66 in the computer processing means 50 which temporarily stores the length, width and height linear dimensions of a carton as determined by unobscured emitters 40 as further explained below. The computer processing means 50 has the capability of recognizing from which of the measuring arms 32, 34 or 36 a signal from the sensor 46 originates, such as by pulsing only one measuring arm at a time, causing the pulse generator to alter the nature of the signals to each measuring arm to be unique, as well as other techniques, all of which are known in the art.

The weighing scale 20 is connected through a line 68 to an interface component 70, which in turn is connected through a line 72 to a central processing unit (CPU) 74 which is part of the computer processing means 50. The first memory storage device 52 and the third memory storage device 66 are also connected within the computer processing means 50 to the CPU 74 so as to transmit the minimum or threshold volume and the linear dimension data from these memory storage devices respectively to the CPU 74. The CPU 74 has the capability of calculating the volume of the carton from the linear dimensions stored in the third memory storage device 66, and then comparing that volume with the predetermined threshold volume from the first memory storage device 52 to determine whether the actual volume is above or below the predetermined threshold volume. The CPU 74 also has the capability of determining the dimensional weight of the carton by dividing the calculated volume by the dimensional constant stored in the memory device 53, and then comparing the dimensional weight with the actual weight of the carton, as determined by the scale 20, to determine which of the two weights is the larger, which would be the shipping weight for that carton.

The CPU 74 further has the capability of sending a signal indicative of that weight via the lines 76 and 78 to a shipping system, designated generally by the reference numeral 80. The shipping system 80 is typically a rather complex processing system which forms no part of the present invention and therefore need not be described other than to mention that it would include a computer processing unit that would store individual carrier rates for different amounts of weight, carrier classes, destination zip codes, and other relevant information, and would respond to the incoming signal that is indicative of the shipping weight by determining an appropriate shipping charge for the carton. Alternatively, the length, width and height measurement data, along with other relevant data such as predetermined threshold volumes and dimensional weight constants, can, if desired, be transmitted to the shipping system either for determination purposes or for printing on a manifest. It should be noted that the computer processing means 50 and all of the components contained therein could be physically located in the shipping system 80 rather than with the dimensional weighing apparatus 10. It is only necessary for complete implementation of the present invention that the computer processing means 50 be operatively interconnected between the measuring frame 30 and the associated optical measuring means, on the one hand, and the shipping system 80 on the other, with the physical location of the computer processing means 50 being a matter of choice.

The operation of the apparatus thus far described is as follows: During a set up phase of the dimensional weighing apparatus 10, the computer processing means 50 is set so as to place a minimum or threshold volume into the first memory storage device 52. For the purpose of illustration in the following description of operation, this volume will be considered to be 1728 cubic inches, or one cubic foot. It should be understood that this volume does not necessarily literally mean a uniform cubic foot, i.e., a carton that is 12"×12" by 12", but rather any combination of length, width and height that, when multiplied together, equals 1728 cubic inches.

During operation, a carton C (FIG. 1) is placed on the scale platform 24 with the rear and side edges respectively of the carton C flush against the upstanding guide rails 26, thereby positioning the carton C in the proper predetermined location for both weighing by the scale 20 and measuring by the measuring arms 32, 34 and 36 in conjunction with the optical measuring means described above. The actual weight of the carton is determined by the scale 20, which for the purpose of this illustration, is assumed to be 10 pounds, and this weight is transferred to the CPU 74 as above described. The pulse generator 54 is energized in a suitable manner when the carton C is placed on the scale, or it may be continuously operating, to energize the emitters 40 in rapid succession.

Again, for the purpose of illustration, it is assumed that the carton C actually measures 12 inches along the measuring arm 32, 14 inches along the measuring arm 34 and 8 inches along the measuring arm 36. If the emitters 40 are evenly spaced one inch apart, it is apparent that approximately the first 12 emitters 40 on the measuring arm 32 will be obscured by the carton C, approximately the first 14 emitters 40 on the measuring arm 34 will be obscured, and approximately the first 8 emitters 40 on the measuring arm 36 will be obscured. The reason why these numbers are given as approximate and not precise is to allow for the possibility that the sensor 46 may see an emitter that is actually obscured by the carton and would not be seen by the sensor 46 if it were positioned in perpendicular relationship to the side of the carton at the point where that side of the carton ends. However, as described above, the sensor 46 is positioned in perpendicular relationship to the ends of the measuring arms 32, 34 and 36, which means that the line of sight of the sensor 46 to any of the measuring arms will be at an angle to the measuring arms at the point adjacent to the end of the carton, which may permit the sensor 46 to see an emitter 40 that is behind the carton if the emitters 40 are positioned sufficiently close together.

Thus, assuming for the sake of illustration that the emitters 40 are not positioned sufficiently close together for the sensor to see any that are actually behind the carton, the first emitter 40 that the sensor 46 sees on the measuring arm 32 is #13; the first emitter 40 that the sensor 46 sees on measuring arm 34 is #15; and the first emitter 40 that the sensor 46 sees on measuring arm 36 is #9. Since the emitters 40 are being energized in sequence by the pulse generator 54, the third memory storage device 66 can remember how many emitters 40 have been energized before the sensor 46 first sees one light and thereby can determine the dimension of the carton that is adjacent the measuring arm 32, 34 or 36 that is then being recognized by the sensor 46. Alternatively, the memory storage device 66 can remember how many emitters 40 have been energized after the first emitter 40 is seen by the sensor 46 until the last emitter 40 on the arm is seen. Again, it is assumed in this illustration that the measuring arms 32, 34 and 36 are sufficiently long, and have a sufficient number of emitters 40 to accommodate this size carton. Typically, the measuring arms 32, 34 and 36 would be in the nature of 30 to 36 inches long.

In actual practice, the CPU 74 has been programmed to round off the linear dimensions of the length, width and height of a carton if the measuring system 30 determines that any of these dimensions include fractional parts of an inch. Although the practice is not universal, most carriers will round to the next higher inch; some will round up or down to the nearest inch; and an occasional carrier will round to the next lower inch.

The CPU 74 then performs two functions. It receives the linear dimensions from the memory storage unit 66 and calculates the actual volume of the carton. In the illustration given, this would equal 1344 cubic inches. The CPU then compares this volume against the threshold volume stored in the memory storage unit 50, and determines that it is considerably less than the threshold volume of 1728 cubic inches, which means that the shipping charge for the carton will automatically be based on the actual weight of the carton as determined by the scale 20, i.e., 10 pounds. A signal indicative of this determination is sent by the CPU 74 via the line 76 and 78 to the shipping system 80, which determines the appropriate shipping charge for the carton as described above and prints out a manifest of the charges for all cartons dimensionally measured during a predetermined period of time, and also prints individual address labels for each carton, typically with bar coded information thereon.

If, on the other hand, a carton C is placed on the scale platform 24 which still weighs only 10 pounds, but the linear dimensions of this carton are, for example, 15 inches on the measuring arm 32, 23 inches on the measuring arm 34 and 11 inches on the measuring arm 36, the same procedure as described above would occur, except that the calculated volume of the carton would now be 3795 cubic inches, far in excess of the threshold volume of 1728 cubic inches. The CPU 74 responds to this situation by determining the dimensional weight of the carton, by dividing the calculated volume by the dimensional constant stored in the memory storage unit 53, which in the example is assumed to be the domestic shipping standard of 194 cubic inches per pound. The CPU 74 divides the calculated volume of 3795 cubic inches by 194, which equals 19.56 pounds, and then compares this weight to the actual weight of the carton as determined by the scale 20 to determine which weight is the larger. In the example given, since the dimensional weight of 19.56 pounds is the larger, the CPU sends a signal indicative of this weight via to the lines 76 and 78 to the shipping system 80, which then determines the shipping charge for 19.56 pounds in the same manner as it did for the smaller carton for which the actual weight was 10 pounds.

If, on the other hand, the actual weight of this carton had been 25 pounds, the comparator 74 would determine that the actual weight is the larger, and would then send this weight to the shipping system 80 for determination of the appropriate shipping charge. Thus, it will be seen that the apparatus 10 effectively converts the volume of a carton which is inordinately large in comparison to its actual weight into a dimensional weight which affords a realistic shipping charge when the dimensional weight is converted into the shipping charge.

Figure 6:
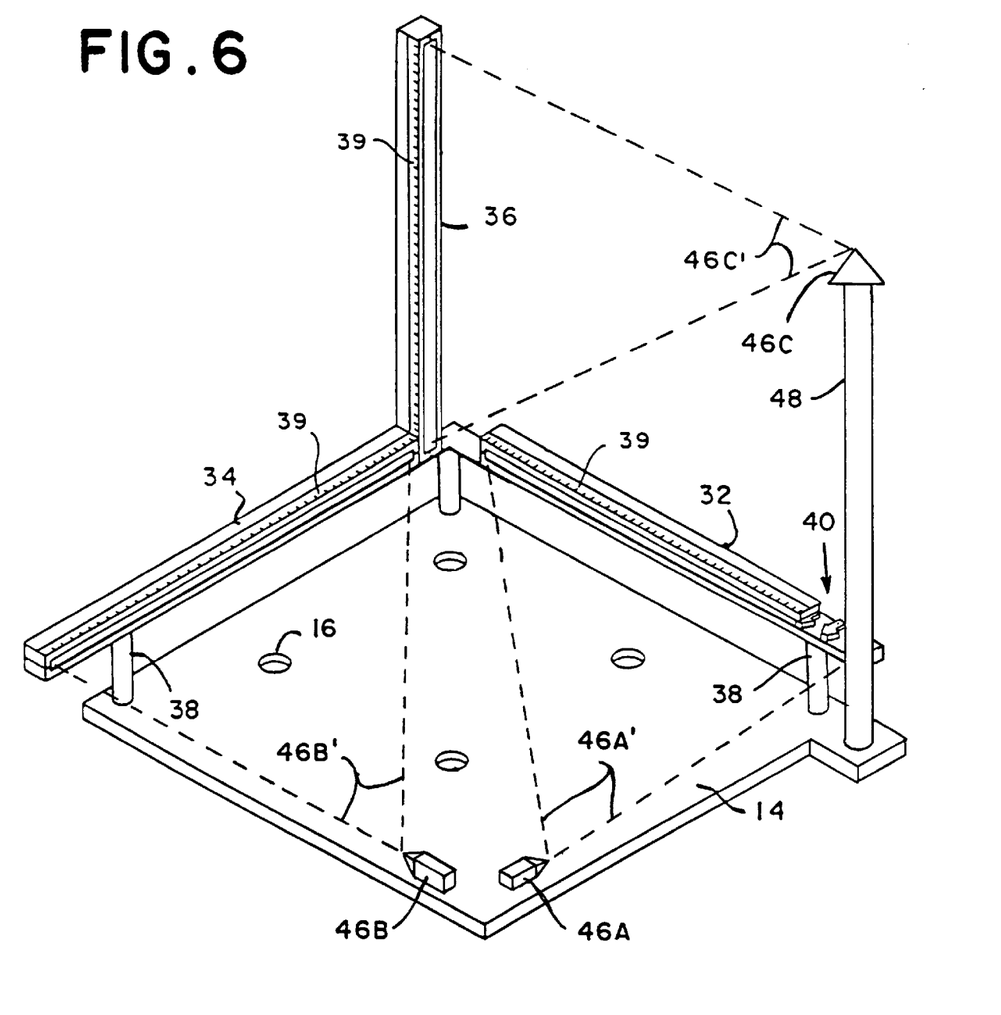
FIG. 6 is a view similar to FIG. 2 showing another embodiment of the invention in which three sensors are utilized instead of one.
Figure 7:
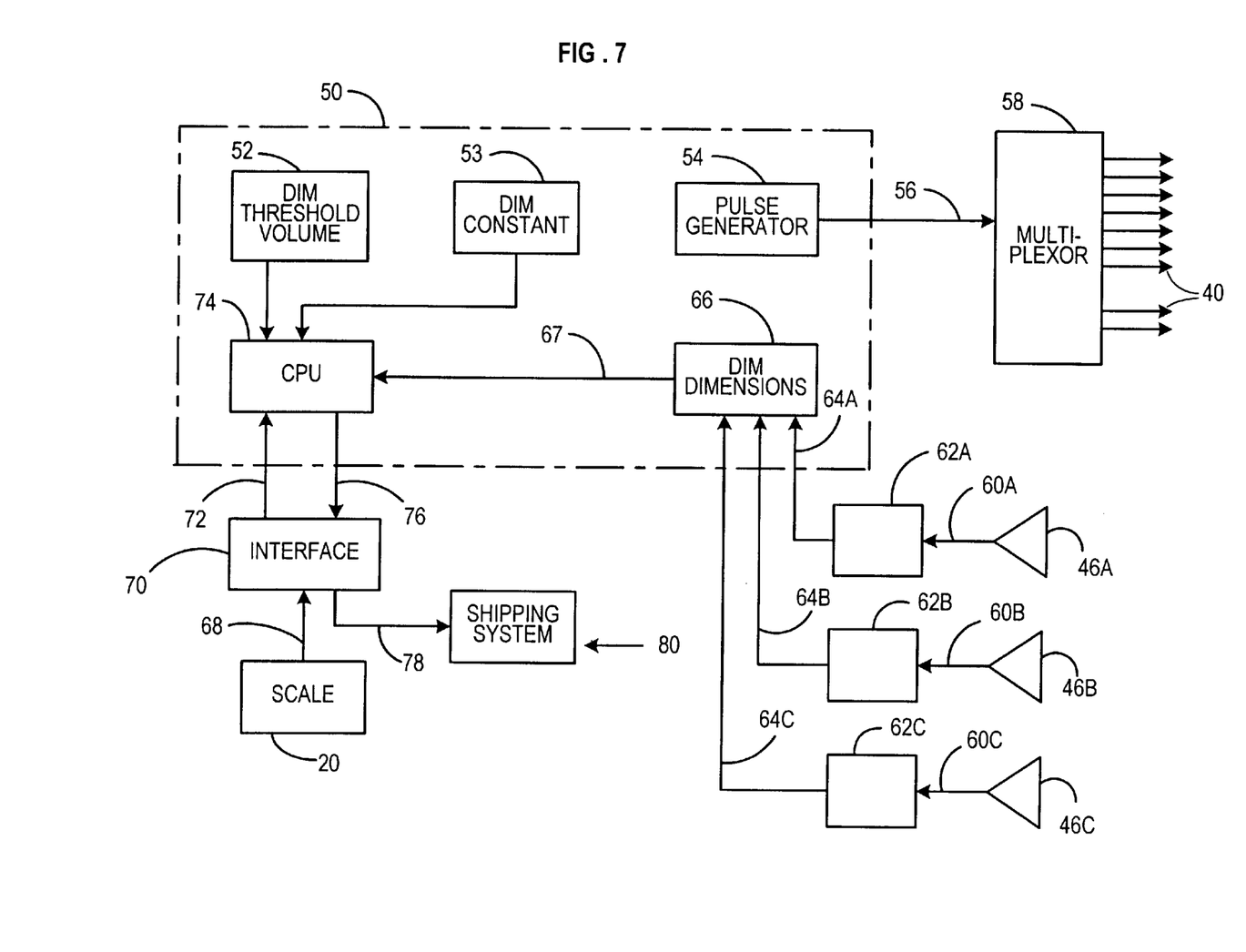
FIG. 7 is a schematic diagram similar to FIG. 5 for the alternate embodiment of the invention.

FIGS. 6 and 7 illustrate another embodiment of the invention in which the single sensor 46 of the previous embodiment is replaced by three individual sensors which respond only to a single measuring arm 32, 34 or 36. Thus, it will be seen in FIG. 6 that there are three sensors 46A, 46B and 46C for the measuring arms 32, 34 and 36 respectively. The sensor 46A is suitably mounted on the base 14 in perpendicular alignment with the free end of the measuring arm 32, and spaced sufficiently far from the measuring arm 32 that the field of vision of the sensor 46A, as represented by the dotted lines 46A' connecting the sensor 46A with the ends of the measuring arm 32, includes the entire length of the measuring arm 32. Another sensor 46B is mounted on the base 14 in perpendicular alignment with the free end of the measuring arm 34, and also is spaced sufficiently far from the measuring arm 34 that the field of vision of the sensor 46B, as represented by the dotted lines 46B' connecting the sensor 46B with the ends of the measuring arm 34, includes the entire length of the measuring arm 34. A third sensor 46C is mounted on the top of the column 48, which can be located adjacent the free end of the measuring arm 32 as shown in the FIG. 6, or alternatively adjacent the free end of the measuring arm 34, so as to be in perpendicular alignment with the free end of the measuring arm 36, and also to be spaced sufficiently far from the measuring arm 34 that the field of vision of the sensor 46C, as represented by the dotted lines 46C' connecting the sensor 46C with the ends of the measuring arm 36, includes the entire length of the measuring arm 36. As was the case with the previous embodiment, any other suitable means of support for the sensor 46C may be utilized.

It will be seen from the electrical schematic of FIG. 7, that the operational control system for this embodiment is substantially the same as that for the previous embodiment, with the exception that the three sensors 46A, 46B and 46C are now connected by individual lines 60A, 60B and 60C respectively to individual amplifiers 62A, 62B and 62C, which in turn are separately connected to the third memory storage device 66 via lines 64A, 64B and 64C. The operation of this embodiment is the same in all respects as that for the previous embodiment, and need not be further described.

The advantages of having three separate sensors over the single sensor of the previous embodiment are that the electronic control system is somewhat simplified in that each sensor carries only a signal indicative of the measurement of the carton along a single measuring arm, with the result that it is no longer necessary to provide the computer processing means 50 with means for discerning which measuring arm is generating the signal sent by the sensor 46 to the computer processing means 50, and the column 48 supporting the sensor 46C for the measuring arm 36 can be moved to a location adjacent the free end of either the arm 32 or the arm 34, thereby moving it out of the area where it would interfere to the greatest extent with the proper placement of cartons on the scale platform 24.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

I claim:

1. Dimensional weighing apparatus adapted for use with a shipping system which determines an appropriate shipping charge for packages and parcels based on an appropriate shipping weight as determined by said dimensional weighing apparatus, said dimensional weighing apparatus comprising:

(a) means defining a supporting surface;

(b) a weighing scale mounted on said supporting surface and having a platform on which cartons are placed for determining the actual weight of the cartons;

(c) a measuring frame operatively associated with said supporting surface;

(d) means operatively associated with said measuring frame for measuring the linear distance of the length, width and height of a carton placed on said platform; and wherein said measuring frame includes a plurality of elongate measuring arms extending from a juncture of said measuring arms disposed adjacent said reference point along the two horizontal axes of a carton disposed on said platform and the vertical axis thereof, said juncture of said measuring arms being disposed in closely spaced relationship with said reference point;

(e) referencing means for defining a reference point for cartons disposed on said platform for positioning cartons in a predetermined location on said platform relative to said measuring frame such that the surfaces of the cartons adjacent the measuring frame are disposed in spaced relationship therewith; and wherein said means defining said reference point further comprises:

(i) guide means mounted on said platform in spaced parallel relationship with said measuring arms for ensuring that said surfaces of a carton disposed on said platform in said predetermined location are disposed in evenly spaced parallel relationship with said measuring arms; and (f) computer processing means responsive to operation of said weighing scale and said measuring means for determining a shipping weight of said carton by calculating the dimensional weight thereof and comparing said dimensional weight with said actual weight to determine which of said weights is the larger, whereby said dimensional weighing apparatus determines the appropriate shipping weight on which the shipping system determines an appropriate shipping charge.

2. Dimensional weighing apparatus as set forth in claim 1, wherein said measuring arms include a linear scale extending along the length thereof from which an operator can manually measure the dimensions of a carton on said platform and calculate the actual volume of the carton therefrom.

3. Dimensional weighing apparatus as set forth in claim 1, wherein said means for measuring the linear distance of the length, width and height of a carton disposed on said platform comprises optical sensing means associated with each of said measuring arms for determining the extent to which each of said adjacent surfaces of a carton disposed on said platform in said predetermined location extends along the adjacent measuring arm.

4. Dimensional weighing apparatus as set forth in claim 3, wherein said optical sensing means comprises:

(a) a plurality of optical emitters mounted on said measuring arms in equally spaced relationship therealong; and (b) a sensor mounted in spaced relationship with said measuring arms in a position such that all of said emitters which are not obscured by a carton disposed on said platform are exposed to the field of vision of said sensor so that said sensor can distinguish between the number of said emitters that are obscured by a carton and the number of said emitters that are not obscured by the carton.

5. Dimensional weighing apparatus as set forth in claim 4, wherein said optical sensing means further includes:

(a) control means for sequentially energizing said optical emitters in rapid succession from one end of said measuring arms to the other; and (b) means responsive to said sensor sensing the first obscured or unobscured emitter, as the case may be, depending upon which direction along said measuring arms said emitters are sequentially energized, for determining the remaining number of emitters along each measuring arm, thereby providing an indication of the linear distance that the adjacent surface of a carton extends along said measuring arms from said reference point.

6. Dimensional weighing apparatus as set forth in claim 3, wherein said optical sensing means comprises:

(a) a plurality of optical emitters mounted on said measuring arms in equally spaced relationship therealong; and (b) a plurality of sensors, one for each measuring arm, mounted in spaced relationship with said measuring arms in a position such that emitters which are not obscured by a carton disposed on said platform are exposed to the field of vision of the sensor associated with that measuring arm so that each of said sensors can distinguish between the number of said emitters on the associated measuring arm that are obscured by a carton and the number of said emitters that are not obscured by the carton.

7. Dimensional weighing apparatus as set forth in claim 1, wherein said computer processing means for determining the shipping weight of said carton disposed on said platform comprises means for determining whether or not the actual volume of the carton exceeds a predetermined threshold volume below which said computer processing means determines a shipping weight based on the actual weight of the carton as determined by said weighing scale, and at or above which said processing means calculates a shipping weight based on the volume of the carton independent of the weight thereof as determined by said weighing scale.

8. Dimensional weighing apparatus as set forth in claim 7, wherein said means for determining whether or not the actual volume of the carton exceeds a predetermined threshold volume comprises:

(a) memory storage means for storing said predetermined threshold volume;

(b) memory storage means for storing the individual linear dimensions of the length, width and height of a carton disposed on said platform;

(c) means for calculating the actual volume of the carton based on said linear dimensions; and (d) means for comparing the calculated volume of the carton with the predetermined threshold volume to determine which is the larger.

9. Dimensional weighing apparatus as set forth in claim 8, wherein said computer processing means for determining the shipping weight of said carton disposed on said platform further comprises means for converting the actual volume of the carton into a dimensional weight thereof and for comparing the dimensional weight with the actual weight to determine which is the larger.

10. Dimensional weighing apparatus as set forth in claim 9 wherein said means for converting the actual volume of a carton into the dimensional weight thereof and for comparing the dimensional weight with the actual weight comprises:

(a) memory storage means for storing a dimensional weight constant in terms of cubic units per unit of weight;

(b) means for calculating a dimensional weight by dividing the actual volume of the carton by said dimensional weight constant; and (c) means for comparing said actual weight of the carton with said dimensional weight thereof to determine which is the larger.

* * * * *